United States Patent [19]
Price R-W et al.

[11] Patent Number: 6,052,068
[45] Date of Patent: *Apr. 18, 2000

[54] VEHICLE IDENTIFICATION SYSTEM

[75] Inventors: Frederick J. Price R-W; Joseph Robert Cleveland, both of Richardson, Tex.

[73] Assignee: Frederick J. Price, Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/824,242

[22] Filed: Mar. 25, 1997

[51] Int. Cl.$^7$ ......................................................... G08G 1/01
[52] U.S. Cl. .......................... 340/933; 340/928; 340/902; 340/904; 235/380; 235/384; 342/457
[58] Field of Search ................ 340/988, 932.2, 340/933, 928, 901–905, 934–936, 991, 825.54, 825.49; 364/436; 342/457; 235/380, 384

[56] References Cited

U.S. PATENT DOCUMENTS

| | | | |
|---|---|---|---|
| 3,720,911 | 3/1973 | Bomar et al. | 340/988 |
| 3,967,202 | 6/1976 | Batz | 340/928 |
| 4,001,822 | 1/1977 | Sterzer | 343/6.5 SS |
| 4,303,904 | 12/1981 | Chasek | 340/928 |
| 4,551,725 | 11/1985 | Schaffer | 343/6.5 SS |
| 4,701,760 | 10/1987 | Raoux | 340/993 |
| 5,101,200 | 3/1992 | Swett | 340/937 |
| 5,105,179 | 4/1992 | Smith | 340/468 |
| 5,204,675 | 4/1993 | Sekine | 340/933 |
| 5,347,274 | 9/1994 | Hassett | 340/988 |
| 5,365,551 | 11/1994 | Snodgrass et al. | 340/825.21 |
| 5,406,275 | 4/1995 | Hassett et al. | 340/933 |
| 5,424,727 | 6/1995 | Shieh | 340/928 |
| 5,424,747 | 6/1995 | Chazelas et al. | 342/70 |
| 5,459,304 | 10/1995 | Eisemann | 235/380 |
| 5,504,474 | 4/1996 | Libman et al. | 340/572 |
| 5,526,357 | 6/1996 | Jandrell | 340/988 |
| 5,533,045 | 7/1996 | Hasegawa et al. | 375/200 |
| 5,534,856 | 7/1996 | Cadman | 340/825.34 |
| 5,550,551 | 8/1996 | Alesio | 342/457 |
| 5,552,993 | 9/1996 | Buchwicz et al. | 364/449 |
| 5,568,512 | 10/1996 | Rotzoll | 375/211 |
| 5,602,919 | 2/1997 | Hurta et al. | 340/928 |
| 5,805,082 | 9/1998 | Hassett | 340/928 |
| 5,847,661 | 12/1998 | Ricci | 340/905 |

*Primary Examiner*—Nina Tong
*Attorney, Agent, or Firm*—Locke Liddell & Sapp LLP

[57] ABSTRACT

A vehicle identification system for identifying motor vehicles in a group of vehicles at distances in excess of 200 feet is disclosed. The system includes an interrogator for directionally broadcasting an interrogation signal toward a vehicle of interest and a set of vehicle identification tags attached to the vehicles for receiving interrogation signals and sending a response signal to the interrogator. The response signal consists of information from the memory in the vehicle identification tag which allows the interrogator to identify the ownership or registration of the vehicle. Preferably, the tags have at least two memory portions with one portion being more secure than the other. Information useful to law enforcement agencies may be stored in the more secure memory portion and information for public or commercial use, such as parking access codes and toll information may be stored in the less secure memory portion. The system can link to an external database to verify and obtain more information regarding the owner of the vehicle, such as name, address, and record of traffic violations. Each tag on the vehicle also communicates with the other tags in the tag set on a vehicle, and, if the tags within a set are separated beyond a preset distance or otherwise subjected to tampering, the tags will transmit an alarm to any nearby interrogator.

31 Claims, 12 Drawing Sheets

VEHICLE IDENTIFICATION SYSTEM

BACKGROUND OF THE INVENTION

1. Field of the Invention

The present invention relates to an identification system for use in connection with the identification of motor vehicles. The vehicle identification system has particular utility in connection with law enforcement.

2. Description of Related Art

In the execution of their responsibilities to protect life and property, law enforcement officials must determine the registration and ownership of motor vehicles from the vehicle's license plate as quickly and safely as possible. Optical identification means historically used by these officials to determine the registration and ownership of motor vehicles adds to their burden to quickly resolve uncertain or dangerous situations. The current procedure limits the access to critical information because existing methods of determining a license plate number require visually reading the number from the plate, often from the rear of the vehicle. Optical or visual methods do not allow a rapid determination of a mismatch between the vehicle description and original registration or license information. In some circumstances, criminal intent, mud or poor lighting limits the visibility of license plate numbers.

Radio frequency identification techniques with compact, low-powered devices have long been known in the art. However, present devices and systems have deficiencies which hamper their effectiveness. Current approaches consist of a single tag and an interrogator. The current tags usually are small in size and transmit radio frequency electromagnetic signals at low power to extend the battery life. These approaches do not employ advanced signal techniques to thwart data errors caused by automotive electromagnetic interference or fading caused by multipath propagation. The small size of existing tags also results in an inefficient antenna. Tags with low power and inefficient antennae limit the transmission distance of the tag's transmissions to less than two hundred feet. Because the unaided eye can distinguish license plate numbers at similar ranges, the operation of an RF tag/interrogator system at these ranges does not provide any significant advantage over optical or visual techniques for determination of license plate numbers. In addition, current interrogators do not have means to distinguish the signals transmitted by multiple tags that receive the interrogator transmission or to consult local or remote databases. Further, the information transmitted by current tag systems is not secure, thereby permitting unauthorized people to access the personal information of a motor vehicle owner.

The need, therefore, exists for a tag/interrogator system which can safely and reliably improve the identification of motor vehicles.

SUMMARY OF THE INVENTION

The system of the present invention overcomes the abovementioned disadvantages and drawbacks which are characteristic of the related information. The present invention is a system for identification of a motor vehicle comprising an interrogator for sending an interrogation signal and a set of vehicle identification tags for receiving the interrogation signal and sending a response signal consisting of information in a memory of the vehicle identification tag. The memory of each vehicle identification tag comprises two portions with one portion being more secure than the other. Law enforcement information such as vehicle registration and owner identification records, may be stored in the secure memory portion of each tag. The less secure layer of memory can store information for public use, such as parking access and toll information.

Interrogators may be mobile or fixed at a location, depending on the intended use of the system. Interrogators for use by law enforcement prompt a vehicle identification tag to respond with information from the secure memory. Interrogators available to non-governmental entities prompt a vehicle identification tag to respond with information from the less secure memory. Both interrogators can cross-link the data in the vehicle identification tag to an external database, which may reside in a computer hardwired to the interrogator or in a remote location using a communications link. An interrogator may also rewrite the less secure layer of memory. For example, if data in the less secure layer comprises prepaid tolls, the interrogator can deduct toll charges from the data and rewrite the less secure layer with a new credit balance.

The system can determine a vehicle's identification even when multiple vehicles within the range of the system respond to the interrogator's signals. The interrogator receives this information, which is encrypted for security purposes, and can link to an external database to verify the information and use it to obtain other records, such as identification, address, and vehicle owner traffic violation and criminal record information. Each tag on a vehicle also communicates with the other tag(s) in the set, and, if the tags within a set are separated beyond a preset distance or otherwise subjected to tampering, the tags will transmit an alarm to any nearby interrogator. Each separated tag will also produce a visible alarm signal.

Numerous objects, features and advantages of the present invention will be readily apparent to those of ordinary skill in the art upon a reading of the following detailed description of the presently preferred, but nonetheless illustrative, embodiments of the present invention when taken in conjunction with the accompanying drawings.

DESCRIPTION OF THE PREFERRED EMBODIMENT

Figure 1:
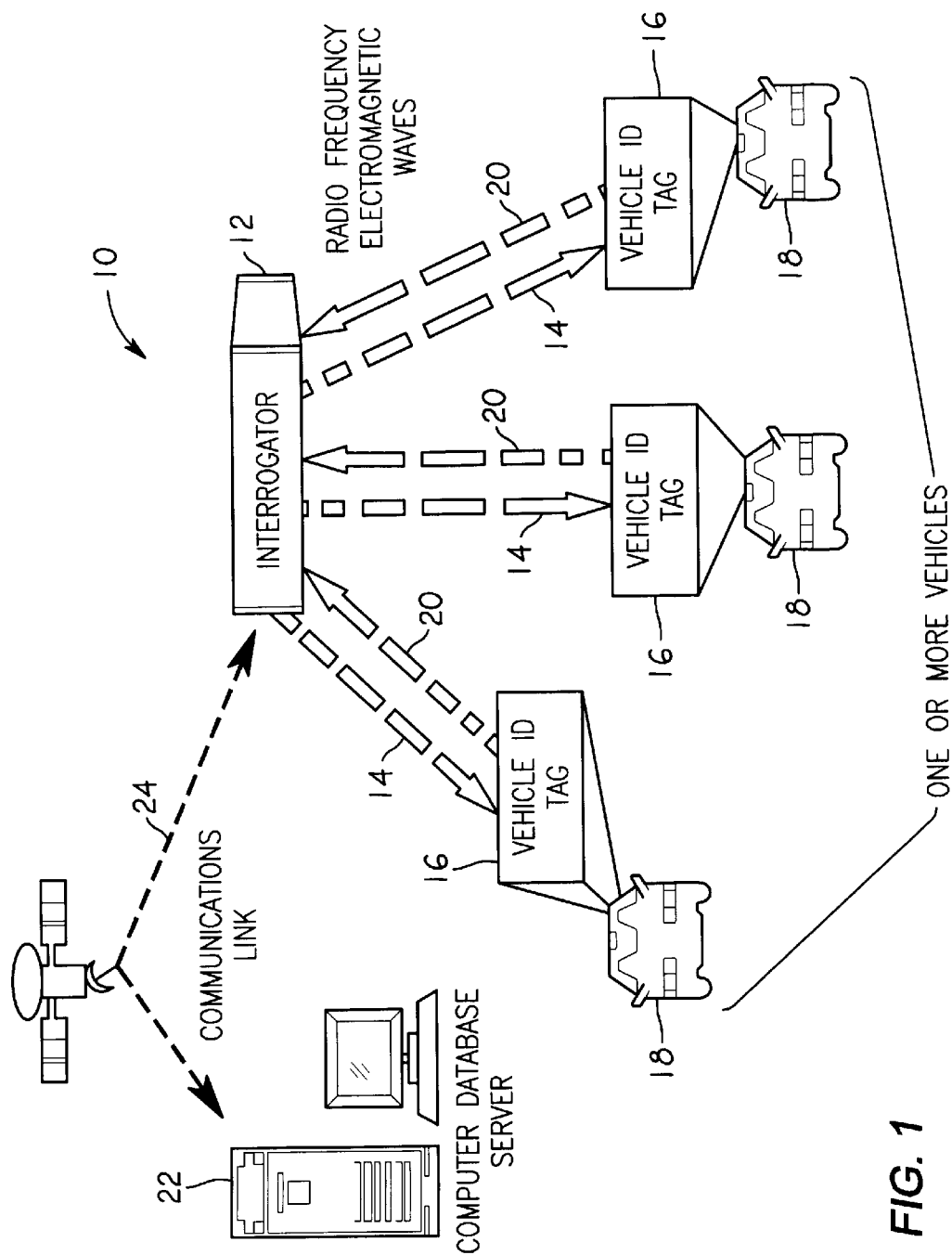
FIG. 1 is a block diagram illustrating a basic vehicle identification system that uses RF signals as a medium to obtain vehicle registration data.
Figure 2:
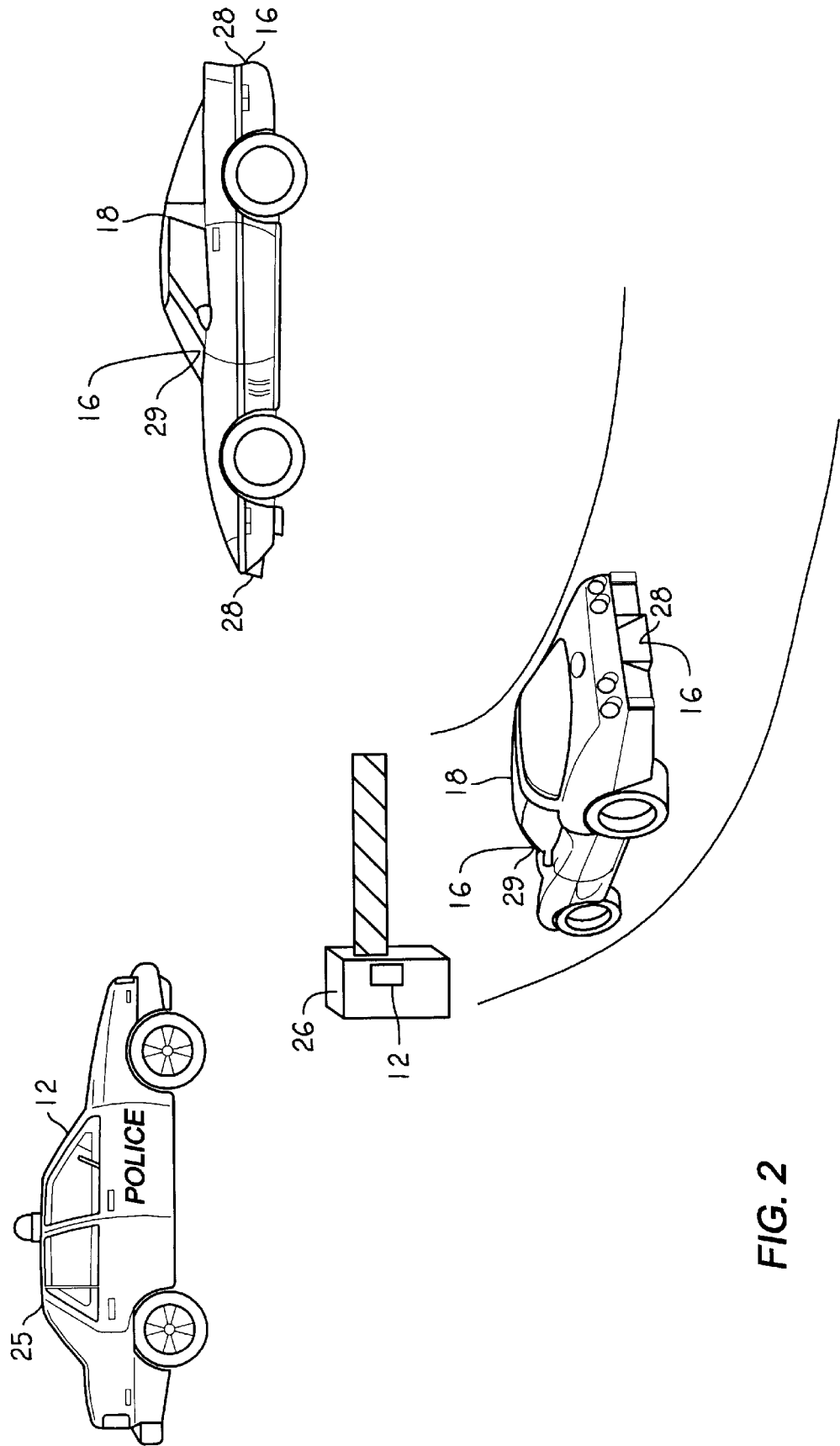
FIG. 2 is a representation of a vehicle identification system in use.
Figure 3:
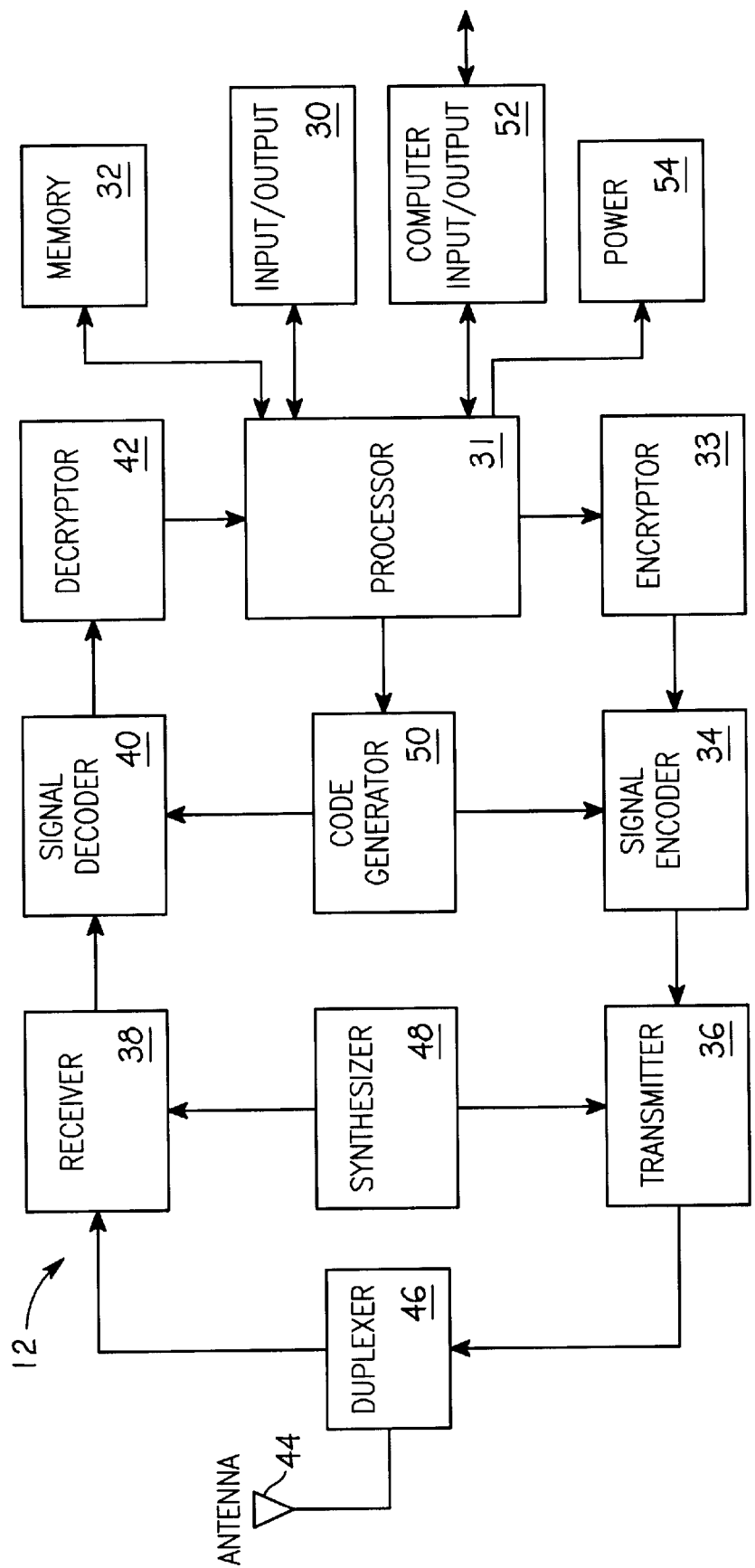
FIG. 3 is a block diagram of the functional components of the vehicle identification tag interrogator of the present system.

Referring now to the drawings, and particularly to FIGS. 1–3, a preferred embodiment of a vehicle identification system of the present invention is shown and generally designated by the reference numeral 10.

FIG. 1 is a block diagram of a preferred mode of the automatic vehicle identification system. The system comprises an interrogator 12 for sending a radio frequency (RF) interrogation signal to a set of vehicle identification tags (VITs) 16.

In operation, an interrogator 12 transmits an interrogation signal 14 consisting of an encoded signal modulated onto a RF carrier signal to two or more vehicle identification tags (VITs) 16 mounted on respective vehicles 18 in its vicinity as shown in the figure. The signal from the interrogator 12 is directional, enabling the interrogator 12 to identify vehicles within a limited area. The interrogator signal 14 is an encoded, encrypted signal in order to protect against jamming, assure the integrity of transmitted and received data, provide reliable data exchange in noisy electrical conditions and prevent unauthorized access to internal processes and data. The interrogator 12 may be located in a police car on patrol or it may be at a fixed location, such as in a high crime area. Each VIT 16 that receives RF signals 14 first processes the signal to validate the authenticity of the received message. When the VIT 16 receives a properly encoded RF signal 14 from an interrogator 12, it performs a decoding decryption process to extract the encoded message from the signal 14. After receipt of a validated message, the VITs 16 within a set on a vehicle communicate with each other to determine which VIT 16 received the strongest signal from the interrogator 12. The VIT 16 receiving the strongest signal then emits a response signal 20, which is an encoded RF signal, in response to the interrogator signal 14. By having the VIT 16 which receives the strongest signal respond to the interrogator, the reception distance is optimized. As a further advantage of having only a single VIT 16 emit a signal, less power is expended. In the alternative, all VITs 16 could transmit a response signal 20 and the interrogator 12 could filter weak or duplicate responses, processing only the strongest of the signals received from the same vehicle.

The memory of each VIT 16 has a secure portion and a less secure portion. Law enforcement information, such as vehicle registration and owner identification records, are stored in the secure layer of memory of each tag. Interrogators 12 for use by law enforcement prompt a VIT 16 to respond with information from the secure memory portion. A less secure layer of memory can store information for public use, such as parking access and toll information. Interrogators 12 available to non-governmental entities may prompt a VIT 16 to respond with information from the less secure memory portion. An interrogator 12 may also modify or rewrite the less secure portion of memory. For example, if data in the less secure portion comprises prepaid tolls, the interrogator can deduct toll charges from the data and rewrite the less secure layer with a new credit balance. At the end of its transmission, the VIT 16 turns off its transmission circuitry and turns on its receiver circuitry.

Upon receipt of a response signal 20 from a VIT 16, the interrogator 12 processes the signal to recover the data contained in the signals. Preferably, the RF signal generated by each VIT 16 is modulated and has unique identification codes embedded therein to allow the interrogator to distinguish response signals 20 transmitted by one VIT 16 from other VIT response signals 20, when, for example, multiple VITs 16 respond to a signal 14 transmitted from an interrogator 12. When the interrogator 12 receives a valid response message from a VIT 16, it stores the vehicle identification information contained in the message in memory and displays the data to the operator. When connected to a remote or local computer database server 22 by a communications link 24 for access to databases such as motor vehicle records, criminal files, or warrant files to analyze vehicle identification records and owner information, the interrogator 12 allows authorized law enforcement officers to compare the stored registration information in the interrogator 12 with computer databases to determine if grounds exist to investigate the vehicle or its occupants. The computer database server 22 can also contain information, such as parking authorization or entrance authority, for commercial use. The interrogator 12 may also use a communications protocol such as the Point-To-Point Protocol (PPP), X.25 or Transport Control Protocol/Internet Protocol (TCP/IP), or any other protocol that will be obvious to those skilled in the art, to establish the communications link 24 with the remote computer database server 22. The interrogator 12 has the capability to communicate with remote computer database servers 22 over communications paths that include, but are not limited to: wire telephony circuits, cellular telephony circuits, and satellite circuits. During communications with a remote computer database server, the interrogator 12 can display the status of the computer network query to the interrogator operator. The interrogator 12 and VIT 16 take no action on received transmissions with messages that cannot be authenticated.

FIG. 2 depicts the preferred embodiment of the system in more detail. The interrogator 14 may be located in a moving vehicle, such as a police car 25, or at a fixed location, such as a limited access gate 26. Fixed interrogators may also be used for vehicle polling. For example, the interrogator can be used to poll vehicles in a high crime location, monitor traffic speeds, or monitor access to a car park or toll road.

A plurality of VITs 16 are attached to vehicles 18. In the embodiment shown, a set of two VITs 16 is used. The first VIT 16 is affixed to a license plate 28 of a vehicle. The second tag 16 is placed in a secure location, such as the inside of the windshield 29. A position underneath the hood of the vehicle, however, could also be a suitable secure location for a tag.

State vehicle registration agencies, department of motor vehicle (DMV) agencies or other authorized government agencies could issue a set of VITs 16 in conjunction with a license plate at the time of vehicle registration. VITs 16 may be programmed with data selected and entered by the issuing governmental agency, including a permanent registration number and expiration date. The information entered by the agency cannot be altered without a password; however, a secondary memory layer or portion may be programmed by a user interface, allowing VITs 16 also to function as parking cards, toll tags and other types of access or charge cards. The VIT 16 set remains in an inactive state until it is mounted to the vehicle. The purpose for this inactive setting is to prevent unintentional activation of a VIT 16 by interrogators in its radio reception range prior to its being attached to registered vehicles 18. The VITs 16 are mounted to the vehicles 18 at a place designated by the state. The expiration date of the VIT is printed on the VIT 16 and visible on the exterior of the vehicle. The VIT 16 uses secure techniques to prevent unauthorized entry of an activation pass key or access to internal processes and data. Once activated, the VIT 16 processor turns on power to the receiver circuitry for reception of the RF signals and turns off power to the transmission circuitry to conserve internal power. The VIT operates from an internal power source that can be externally recharged.

Different types of interrogators 12 may be used in conjunction with VITs 16. The primary type of interrogator would only be made available to governmental agencies, and receives information programmed by the issuing agency from the VITs. A secondary interrogator may be acquired by non-governmental establishments and used to receive information programmed by the establishment into the VIT's second memory portion, such as car park access, entry authority and toll road charges.

FIG. 3 is a block diagram of the interrogator 12 presented in FIGS. 1 & 2. The interrogator 12 comprises an operator input/output 30, a processor 31 for message data generation and detection, digital memory 32 for storage of program software and data, encryptor circuit 33 for data protection of transmitted messages, signal encoding circuit 34 for generating an encoded signal by transmitter 36 which up-converts and amplifies the signal, receiver 38 which amplifies and down-converts the received signal from a transmitting VIT, one or more signal decoding circuits 40 for demodulating the received signals, decryptor 42 for received messages, an antenna 44 to transmit and receive encoded RF signals, duplexer 46 for switching transmitted electromagnetic signals from the transmitter 36 to the antenna 44 and for switching signals received by the antenna 44 to the receiver 38, a synthesizer 48 for generating high frequency carrier to the transmitter 36 for up-conversion of the RF signal to the transmission frequency and to the receiver 38 for down-conversion of the received RF signal from the transmission frequency, a code generator 50 for generating one of a plurality of codes for spread spectrum coding of the RF signal, a computer input/output circuit 52 for connecting the interrogator 12 to a remote computer database server over external circuits and a suitable power supply 54. In a preferred embodiment, the interrogator power supply 54 uses either standard 110-volt ac power, 12-volt dc power from a vehicle electrical system or from internal rechargeable battery power, although other types of power supplies known to those in the art could be used.

To initiate interrogation of a VIT 16 on a vehicle 18, the operator uses the input/output 30 to command the processor 31 in the interrogator 12 to generate a query message for transmission. The processor 31 is a commercially available digital signal processor. The processor 31 performs encoding and interleaving of the message data prior to passing the message data to the encryptor circuit 33. Preferably, the encryptor 33 employs the Digital Encryption Standard (DES) algorithm, however, other types of encryption, preferably other algorithms approved by the National Institute of Science and Technology (NIST), may be used. Preferably, the encryptor 33 employs a separate encryption circuit, however, a software-based encryption algorithm could be used by the processor 31.

The signal encoding circuit 34 receives the encrypted digital data from the encryptor 33 and modulates the code provided by the code generator 50. Preferably, high frequency, spread-spectrum modulation is used; however, other forms of signal propagation may be used. High-frequency, spread-spectrum modulation improves signal detection under multipath propagation conditions and lowers the peak power of the transmitted RF electromagnetic waveform. The signal encoder circuit 34 uses conventional spread-spectrum modulation.

The transmitter 36 mixes the high frequency carrier signal with the spread-spectrum modulated signal to up-convert the spread-spectrum modulated signal to the transmission frequency band and provides any needed amplification and filtering of the spread-spectrum modulated signal prior to transmission by the antenna 44 through the duplexer 46. The antenna 44 converts the spread-spectrum modulated signal into a RF spread-spectrum signal. Upon initiation of the interrogator 12 by the operator via the input/output 30, the processor 31 switches the duplexer 46 to the transmitter 36 to protect the receiver 38 from damage by the RF signal sent from the transmitter 36 to the antenna 44 during transmission of the encoded RF signals. Upon completion of the transmission of the RF signals, the processor 31 switches the duplexer 46 from the transmitter 36 to the receiver 38 in order for the interrogator 12 to receive RF signals transmitted by one or more VITs.

During reception, the antenna 44 receives RF signals and converts the RF encoded signals into RF spread-spectrum modulated signals which pass through the duplexer 46 to the receiver 38. The receiver 38 provides any needed amplification of the received RF spread-spectrum signal from the antenna 44 and mixes the high frequency carrier signal from the synthesizer 48 with the received spread-spectrum signal to down-convert the spread-spectrum RF signal. Spread-spectrum modulation provides improved signal detection of signals received from the VIT under multipath propagation and high electromagnetic noise conditions.

One or more signal decoders 40 receive the down-converted spread-spectrum modulated RF signal from the receiver 38. The decoder 40 performs spread-spectrum demodulation with the code provided by the code generator 50 to produce one or more digital data streams that contains one or more encrypted message data transmitted by one or more VITs. Each signal decoder includes a digital data buffer to store the digital data for encryption. The signal decoder 40 uses conventional spread-spectrum demodulation circuitry. The signal decoder 40 passes the demodulated digital data stream to the de-encryptor 42, which uses the same algorithm and encryption key as used by the encryptor 33. The processor 31 performs decoding and de-interleaving of the data message received from the de-encryptor 42 then displays the received vehicle registration data on the input/output 30 to the authorized operator. The operator may elect to establish a connection to a remote computer database server through a computer input/output 52.

Modulation encoding used by the interrogator 12 and VITs 16 mitigates two basic causes of performance degradation of signal quality, namely (1) multipath fading of the radio link and (2) interference caused either by other radio transmitters in the vicinity and by electromagnetic interference from automotive devices. The system 10 uses wide-band spread spectrum modulation encoding with a pseudo-random binary sequence for both the interrogator and VIT signals to enhance performance in the presence of these degradations. The pseudorandom number (PN) sequence, or code, gives the transmitted signal an individual signature code. Each receiving VIT uses the same code to demodulate the received signals. To respond to an interrogator, each VIT randomly selects a unique binary sequence, or code, from a list stored in its memory. The number of available codes is large enough so that the probability that two or more VITs in the same vicinity will select the same code is small. The interrogator uses a directive antenna which limits the width of radiation pattern so that only a few vehicle VITs will receive an interrogator transmission that is powerful enough to be recognized.

The receiver of the modulation encoded signals has a synchronized signal decoder which despreads the spectrum with the same PN sequence as that of the corresponding transmitter. Each signal decoder uses a correlator that accepts only signal energy from the binary sequence defined by the assigned code and despreads the spectrum. Signals with codes that do not match the correlator code are not despread. All other waveforms not correlated with the selected binary sequence or code, such as automotive electromagnetic interference, are effectively spread over a wider bandwidth than that of the final demodulator bandwidth. The interrogator has a signal decoder for each possible binary sequence selectable by the VIT. The VIT has a single decoder which uses a code matched to the pseudorandom sequence used by the interrogator to modulation encode the signal for transmission. The wideband character of the modulation by the pseudorandom binary sequence introduces frequency diversity which mitigates against multipath propagation. The waveform also rejects multipath returns that fall outside the correlation interval of the pseudorandom modulation encoding.

The capability of an interrogator to query and receive responses from one or more VITs separated by a distance d up to or greater than 200 feet (~61 meters) is limited by the link loss budget and by the noise or interference at the receiver. Those familiar with the art will recognize the expression for the link loss budget L(d) given by:

$$L(d) = P_R(dBm) - P_T(dBm) = 20 \log \left[\frac{c}{4\pi f}\right] + g_T + g_R - 10n \log(d) + X_\sigma$$

where $P_T$ is the power into the transmitter antenna in dBm, $P_R$ is the power from the receive antenna in dBm, c is the speed of light, f is the frequency, n is the power law relationship between distance and received power, $g_T$ is the transmit antenna gain in dB, $g_R$ is the receive antenna gain in dB, and $X_o$ is a zero mean random variable in units of dB that reflects the variation of received power due to the effects of reflection, diffraction and scattering on the propagation of the signal. In an urban setting for distances up to 200 feet (~61 meters), the power law factor n has a spread of 2–3.5, with a mean value of ~2.7. If the ratio of the received power to the noise (N) plus interference (I), expressed as C/(N+I), exceeds a minimum value, reliable communications exists. In the preferred embodiment, the threshold level corresponds to a bit error rate of $10^{-6}$ or better. In the typical urban environment, automobile ignition noise is a major contributor to interference, which may be greater than 40 dB above the thermal noise level. With spread spectrum modulation, combined with channel encoding of the present embodiment, a C/(N+I) value of typically −15 dB will provide reliable reception. As a result, the required transmitter power $P_T$ is approximately 6 milliwatts or greater with $g_T$=3 dB, $g_R$=0 dB and n=2.7 at a carrier frequency of 800 MHz.

The term $X_o$ describes the statistical variation of the received power. The system 10 allows remote interrogation of a VIT by an interrogator 12 under stationary conditions or when either or both are in motion. As the interrogator 12 and VIT 16 move over distances relative to each other, the instantaneous received signal strength will fluctuate rapidly to give rise to fading. The result is that the many contributions have random phases so the sum behaves as a noisy signal manifested as Rayleigh fading. The received signal power may vary by as much as 20–30 dB when the transmitter-to-receiver separation changes by only a fraction of a wavelength. During periods of fading, the received signal may fall below that needed for reliable reception. It is commonly know that at a frequency of 850 MHz and a relative speed of 15 miles per hour, the rate of fluctuation of the signal reception at a 10-dB level below the average power of a fading signal is 15 nulls per second. The average duration of a fade is approximately 6.6 milliseconds, which exceeds the time period of a digital word. The preferred embodiment of the system 10 uses channel encoding and interleaving to improve reliable transmission of data under these circumstances.

Figure 4:
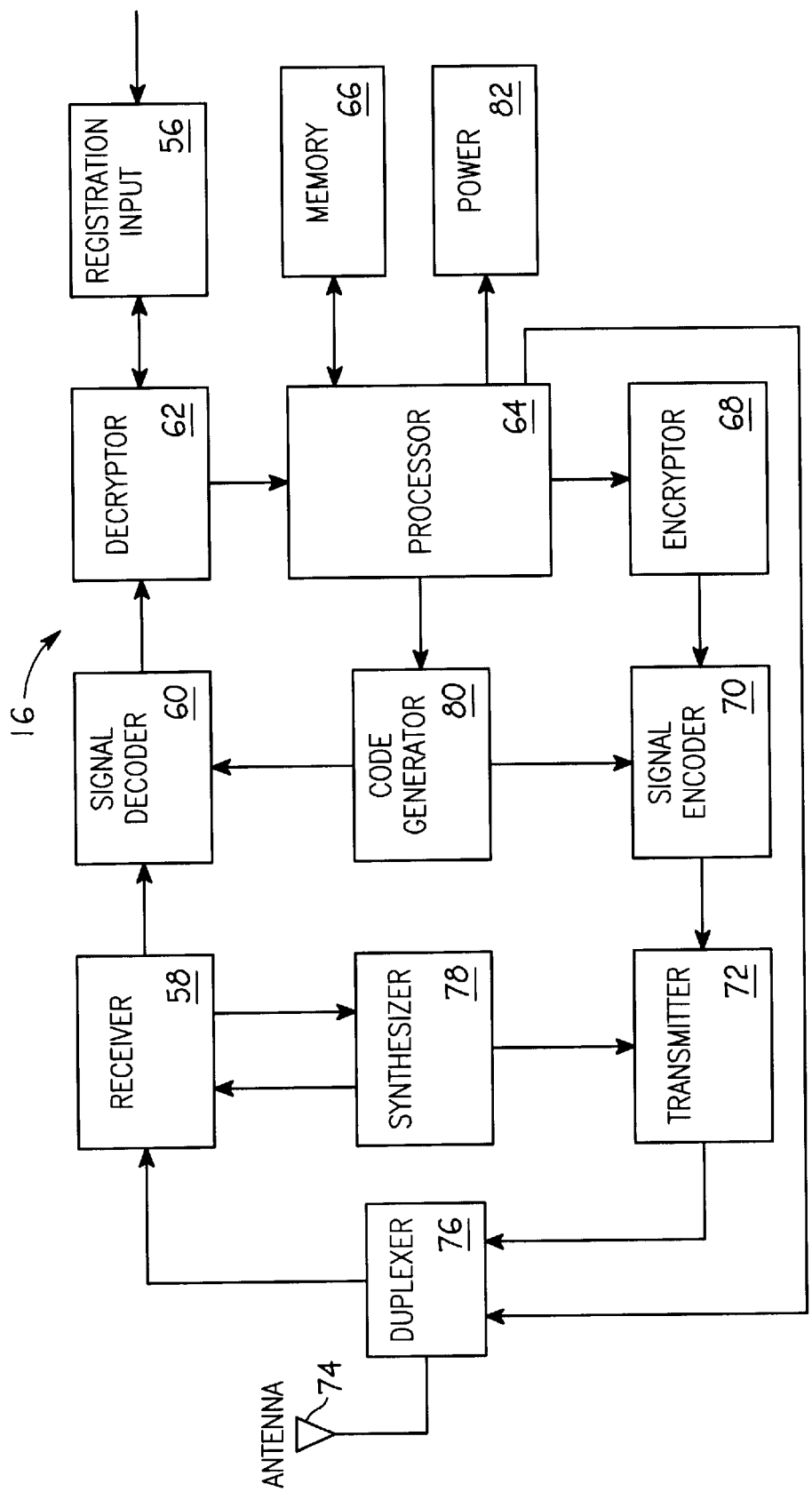
FIG. 4 is a block diagram of the functional components of a vehicle identification tag.

FIG. 4 is a block diagram of a VIT 16. The VIT is programmed via a registration input 56 by a computer that communicates with the processor 64 through the decryption circuit 62 to read or store data in memory 66. The registration computer encrypts the data exchanged with the processor 64 with the same encryption key used by the decryption circuit 62 in the VIT 16. For authorized government purposes, registration software executes in the processor 64 to store data in or retrieve data from the first layer or primary partition of memory 66 for the registration computer. For non-government establishments, registration software executes in the processor 64 to store data in or retrieve data from the secondary layer of memory 66 for the registration computer.

During reception, the antenna 74 receives RF encoded signals and converts the signals into RF spread-spectrum modulated signals which pass through the duplexer 76 to the receiver 58. The receiver 58 amplifies the received RF spread-spectrum signal from the antenna 74 and mixes the high frequency carrier signal from the synthesizer 78 with the received spread-spectrum signal to down-convert the spread-spectrum RF signal. The receiver 58 uses a phase-locked-loop to synchronize the synthesizer 78 to the carrier frequency of the received RF signal. The signal decoder 60 receives the down-converted spread-spectrum modulated RF signal from the receiver 58 and performs spread-spectrum demodulation with the binary sequence provided by the code generator 80 based on the code provided by the processor 64 to produce a digital data stream that contains the encrypted message data. To demodulate the received modulation encoded signal, the code used by the VIT 16 matches that used by the transmitting interrogator 12. The signal decoder 60 uses conventional spread-spectrum demodulation circuitry. The signal decoder 60 passes the demodulated digital data stream to the decryptor 62, which uses the same algorithm and encryption key as used by the encryptor 33. The processor 64 performs decoding, de-interleaving and validation of the message data received from the de-encryptor 62. Upon completion of the message reception, the processor 64 switches the duplexer 76 to the transmitter 72 to protect the receiver 58 from damage by the RF signal sent from the transmitter 72 to the antenna 74 during transmission of the encoded RF signals.

For responding to the interrogator 12 after validation of the received message data, the processor 64 of the VIT 16 retrieves the requested data from memory 66 and performs encoding and interleaving of the response message data prior to passing the response message data to encryptor 68. For a message from a primary interrogator 12 used by an authorized government operator, the processor retrieves the requested data from the primary or first layer memory. For a message from a secondary interrogator used by a non-government establishment, the processor retrieves the requested data from the secondary less secure memory layer. The processor 64 is a conventional digital signal processor. Preferably, encryptor 68 employs the Digital Encryption Standard (DES) algorithm, however, other types of encryption, preferably other algorithms approved by the National Institute of Science and Technology (NIST), may be used.

The signal encoding circuit 70 receives the encrypted digital data from the encryption circuit 68 and uses the code provided by the code generator 80 to modulate the encoded message data with the pseudorandom binary sequence. The processor 64 randomly selects one of several codes for use by the code generator. In the preferred embodiment, high frequency, spread-spectrum modulation is used; however other forms of signal propagation may be used. High-frequency, spread-spectrum modulation improves signal detection under multipath propagation conditions and lowers the peak power of the transmitted RF signal. The signal encoder circuit 70 uses conventional spread-spectrum modulation circuitry.

The transmitter 72 mixes the high frequency carrier signal with the spread-spectrum modulated signal to up-convert the spread-spectrum modulated signal to the transmission carrier frequency and provides any needed amplification and filtering of the spread-spectrum modulated signal prior to transmission by the antenna 74 through the duplexer 76. The antenna 74 converts the spread-spectrum modulated signal into a RF spread-spectrum signal. Upon completion of the transmission of the RF signals, the processor 31 switches the duplexer 46 from the transmitter 36 to the receiver 38 in order for the interrogator 12 to receive RF signals transmitted by an interrogator. The processor 64 also commands the power supply 82 to turn off power to the transmitter 72, signal encoder 70 and encryptor 68 to conserve the VIT battery power. Preferably, the VIT power supply 82 uses internal rechargeable battery power, although other types of power supplies may be used. Integrated into the power supply 82 is a digitally controlled switch for controlling the application of power to selected portions of the VIT 16 in order to conserve battery power.

Figure 5:
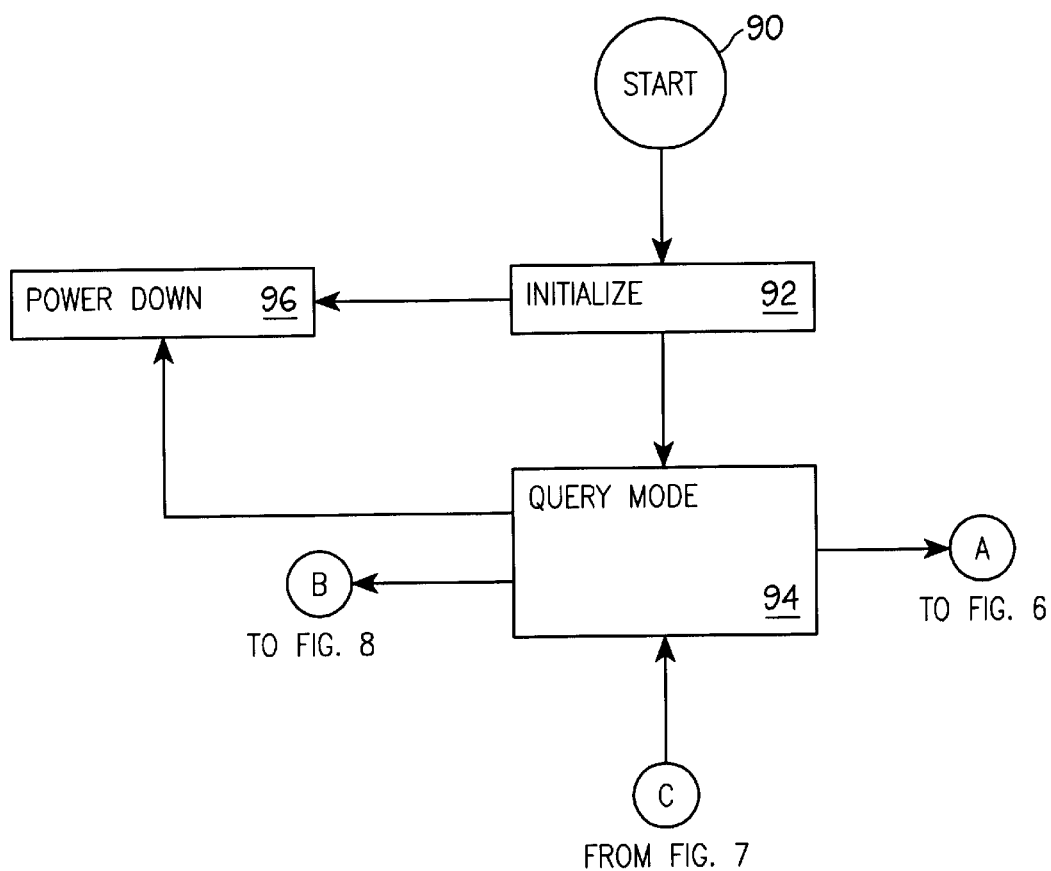
FIG. 5 is a flowchart of a software procedure to initialize and control the operation of the interrogator.

FIG. 5 is a flowchart of a software procedure executed by interrogator processor 28 to initialize and control the operation of the interrogator 12 shown in FIG. 2. The interrogator processes commence when power is applied to the interrogator 12. Initialization circuit 92 performs tasks such as running self-tests on interrogator components. Initialization circuit 92 passes its results to the select query mode 94, which displays the results on the interrogator input/output 26 for operator viewing. If there is an initialization failure, the interrogator 12 branches to power-down 96 upon operator acknowledgment. If initialization 101 is successful, the interrogator input/output 26 displays a message for the operator to enter a password for authorized use of the interrogator. Failure to enter a correct password within a prescribed amount of time or a prescribed number of attempts causes the procedure to branch to power-down 96, which turns off the power to the interrogator hardware. Upon correct entry of the password, the procedure in block 94 displays options for operator input. In the present embodiment, selection of an interrogation mode by the operator causes the procedure to branch to interrogator message creation in FIG. 6. Selection of a database mode by the operator via the input/output, causes the procedure to query the operator on the input/output for a database selection. The database mode allows the operator to read stored data received from a VIT or to establish connection with a local or remote computer or database server. After a database is selected, the procedure jumps to database search mode, described in FIG. 8, to access the database. If the operator selects the receive-only mode via input/output, the procedure branches to block 131 in FIG. 7. Selection by the operator via the input/output to discontinue use of the interrogator causes the circuit to branch to power down 96, which resets the procedure and turns off the interrogator.

Figure 6:
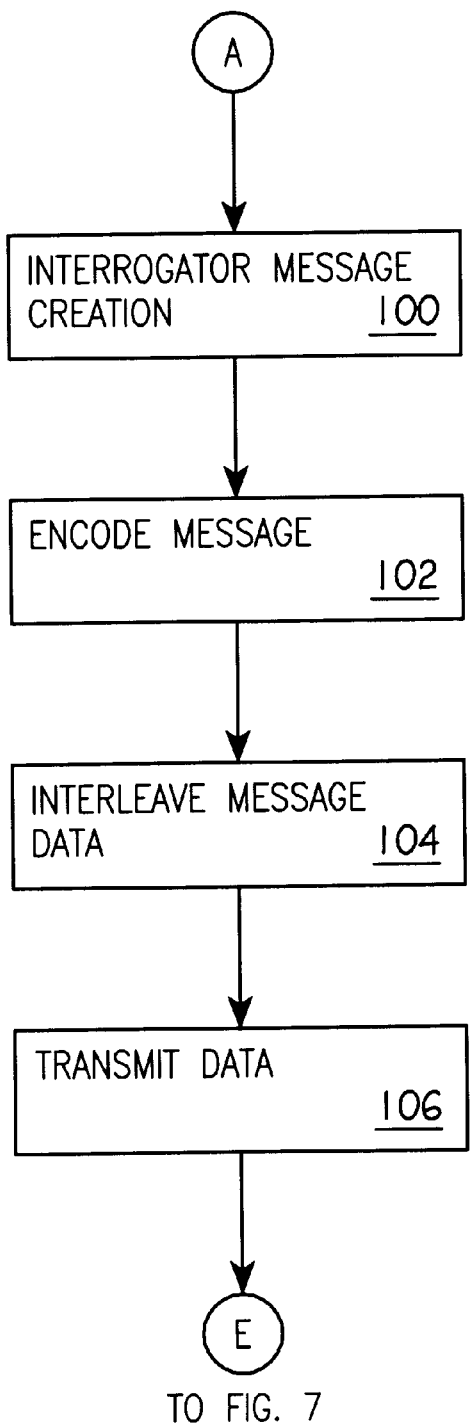
FIG. 6 is a flowchart of a software procedure used by an interrogator to create, encode and transmit a message.

FIG. 6 is the flowchart setting forth a software procedure for the interrogator hardware described in FIG. 3 to create, encode and transmit a message. In the present embodiment, data from the interrogator memory is used to create a message 100. The message is encoded 102. Message encoding 102 comprises channel encoding the message data for error detection, error correction and validation. Next, the encoded digital data is interleaved 104. Interleaving is used to mitigate the effects of multipath fading. After interleaving, the digital data is transmitted 106. To transmit data in the present embodiment, the interrogator duplexer is switched to the transmit path. Then the modulation code is retrieved from memory and sent to the code generator. The modulation code is appended to a digital data synchronization block. A synchronization pulse is initiated by the transmitter, which sends the interleaved and encoded digital data to the encryption block. After the digital data is transferred to the encryption block, transmit data 104 switches the duplexer to receive mode to receive any VIT responses.

Figure 7:
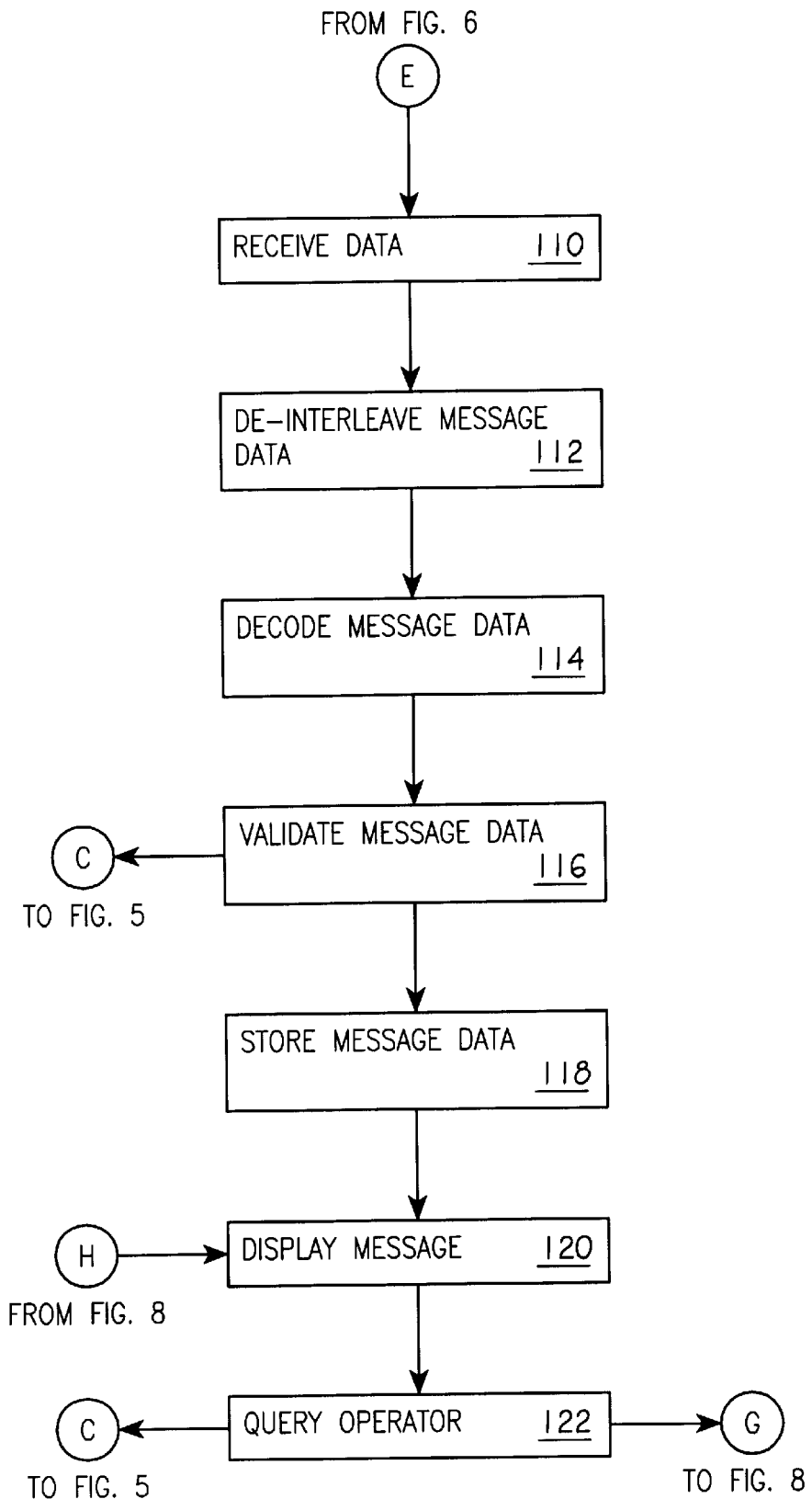
FIG. 7 is a flowchart of a software procedure used by an interrogator to receive, decode and process a message.

FIG. 7 is the flowchart setting forth a software procedure for the interrogator hardware in FIG. 3 to receive, decode and process a message upon activation by the operator in block 94. When the interrogator is in receive data mode 110, the output of the decryption block is monitored for receipt of a digital data stream. If no digital data is received within a prescribed time period, the operator is informed via the interrogator input/output that no VIT data was received. If digital data is received, the procedure passes the digital data stream to the de-interleave message data block 112. The de-interleave block 112 removes the appended synchronization block and de-interleaves the received digital data stream to produce an encoded message data. Next, the de-interleaved data is decoded 114. Decode message data 114 performs error checking and correction. The decoded data is then validated 116 to confirm the message data was originated by an authorized interrogator operator. If the message data is not valid, the procedure branches to query mode 94 and informs the operator via input/output that an invalid message was received. If a valid message was received, the message is stored 118 in memory and displayed 120 on the input/output for operator viewing. The operator is queried 122 via the input/output for action regarding the received message data. If the operator elects to query a computer database for matches of vehicle registration data, the query operator procedure asks the operator to select a database operator on the input/output and then proceeds to establish connection with the desired computer database as detailed in FIG. 8. If the operator elects not to query a computer database, the procedure branches to query mode 94 for operator input regarding a new interrogator selection.

Figure 8:
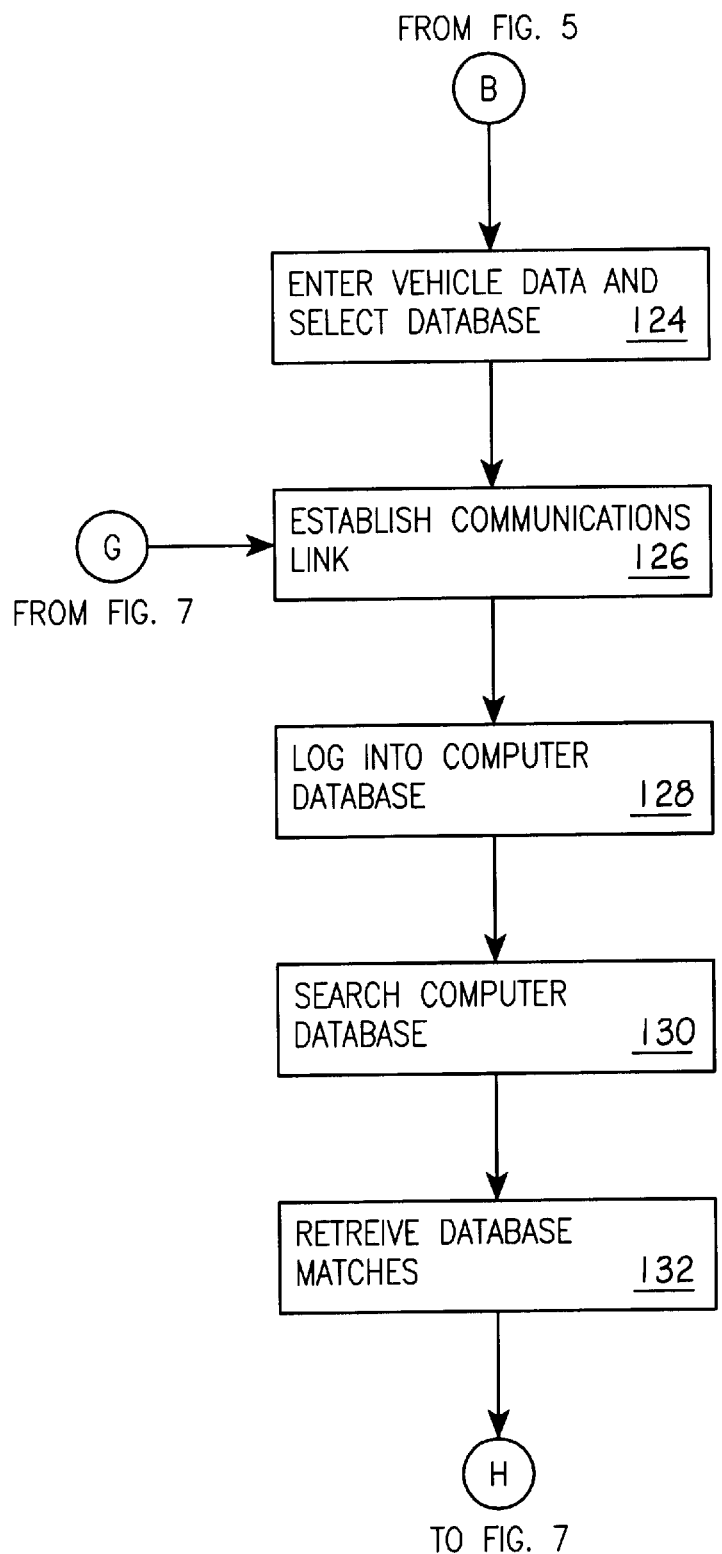
FIG. 8 is a flowchart of a software procedure for the interrogator to search computer databases to link information in the database with information obtained from the vehicle identification tag.

FIG. 8 is the flowchart setting forth a software procedure for the interrogator hardware in FIG. 3 to search computer databases for matches with vehicle registration data. If an operator selects to initiate a database query, the operator enters vehicle data and selects a database 124 from choices programmed into memory. A communications link to the designated computer database is established 126. Once the communications link is established 126, the operator is prompted via the input/output to log into the computer database 128. If the operator does not or is not able to log into the computer database within a specified time limit or within a specified number of attempts, the communications link to the computer is disconnected and a message that the selected computer database login failed is displayed on the input/output. If the computer database is successfully accessed, the database is searched 130 for matches to the vehicle registration data received from the VIT. Any matches found in the search of the computer database are retrieved 132 and displayed on the input/output.

Figure 9:
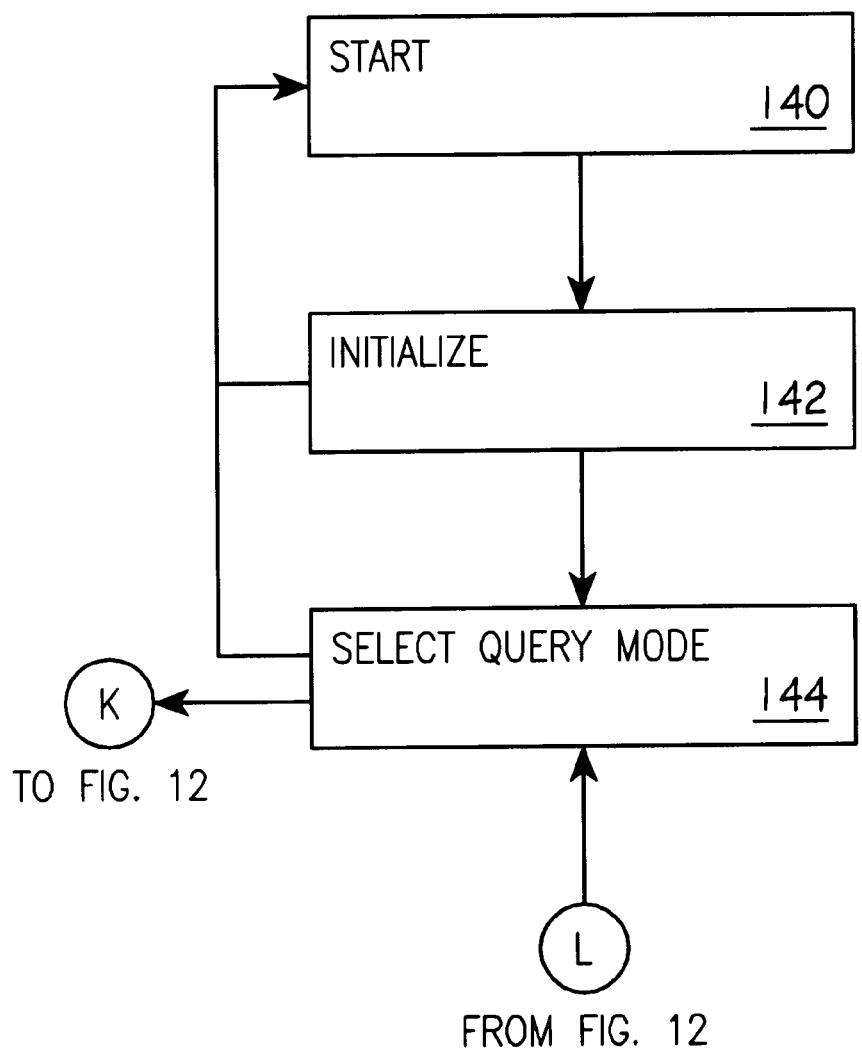
FIG. 9 is a flowchart of a software procedure to initialize and control the operation of a vehicle identification tag.

FIG. 9 is a flowchart of a software procedure that executes in the VIT processor shown in FIG. 3. Upon the application of power to the VIT, program control begins at block 140. The procedure passes control to initialization 142 to perform self-tests on VIT components. Upon completion of self-tests, initialization 142 determines the test results and passes the results to query mode 144, which transfers the test results to the registration input for operator viewing by an external computer. If self-test detects a fault, the procedure notifies the operator through the registration input and returns to start 140. If the self-test procedure is successful, the procedure informs the operator via the registration input and displays a message for the operator to enter a password for authorized access to the VIT. Failure to enter a correct password within a prescribed amount of time or a prescribed number of attempts causes the procedure to return to start 140. Upon correct entry of the password through the registration input, the procedure in block 144 displays options for operator input, for example, message creation.

Figure 10:
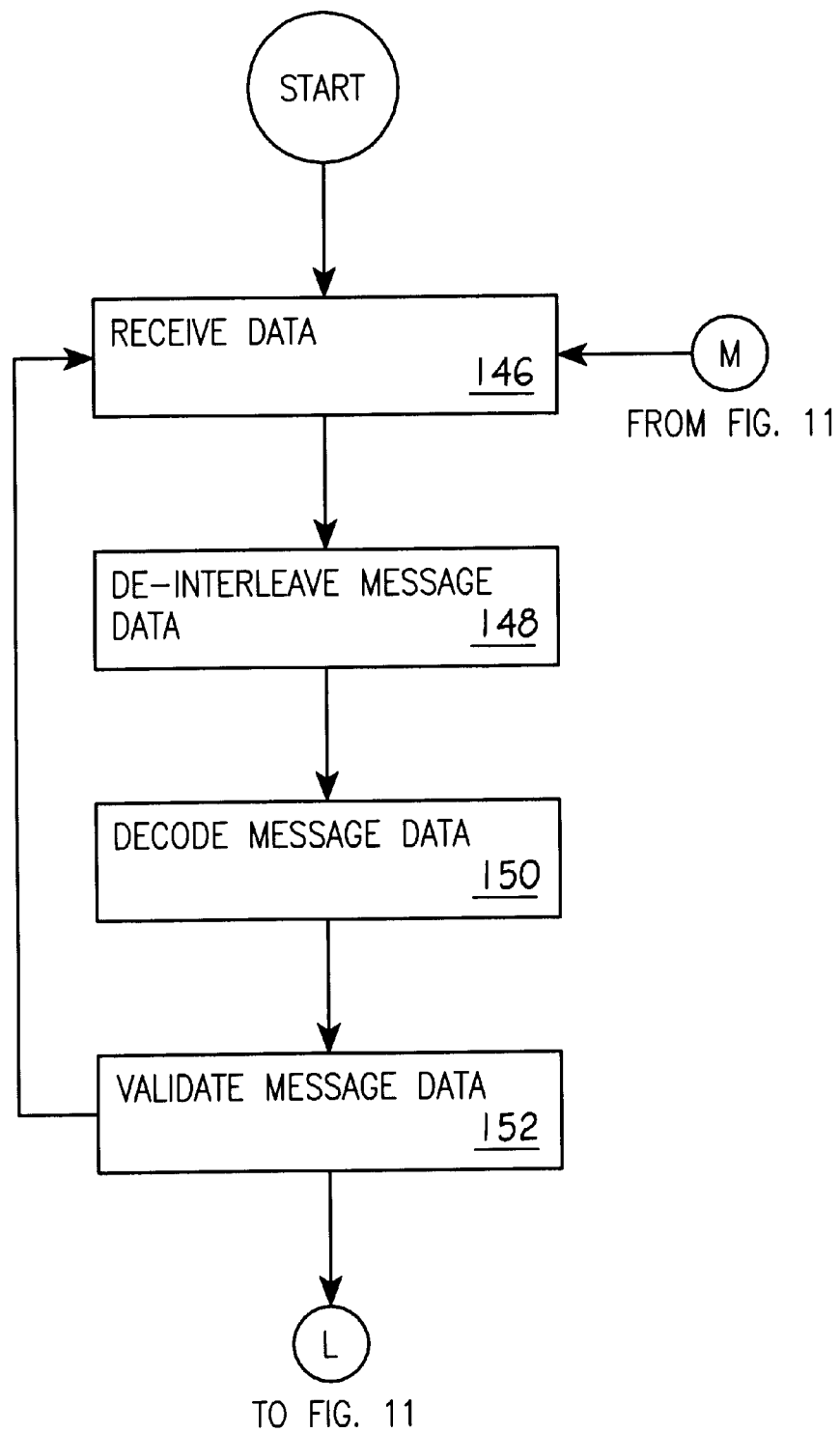
FIG. 10 is a flowchart of a software procedure used by an identification tag to receive, decode and process a message.

FIG. 10 is the flowchart of a software procedure for a VIT to receive, decode and process a message upon receipt of a message from an interrogator. To receive data 146, the output of the decryption block is monitored for receipt of a digital data stream. When digital data is received, the digital data stream is de-interleaved 148. De-interleaving message data 148 also removes the appended synchronization block to produce encoded message data. Next, the de-interleaved data is decoded 150 and error checking and correction is also performed. The message data is validated to confirm it was originated by an authorized interrogator. If the message data is not valid, the procedure returns to receive mode 146 and awaits the next interrogation message. If the message is valid, a response to the transmitting interrogator is generated according to FIG. 10.

Figure 11:
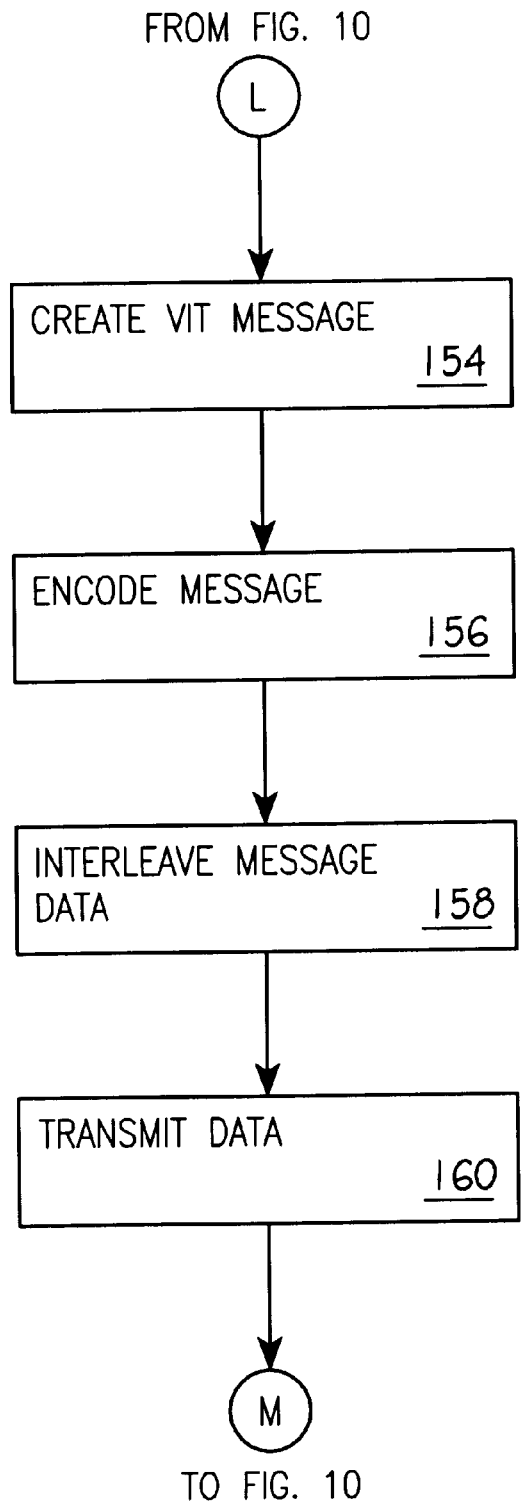
FIG. 11 is a flowchart of a software procedure used by an identification tag to create, encode and transmit an message.
Figure 12:
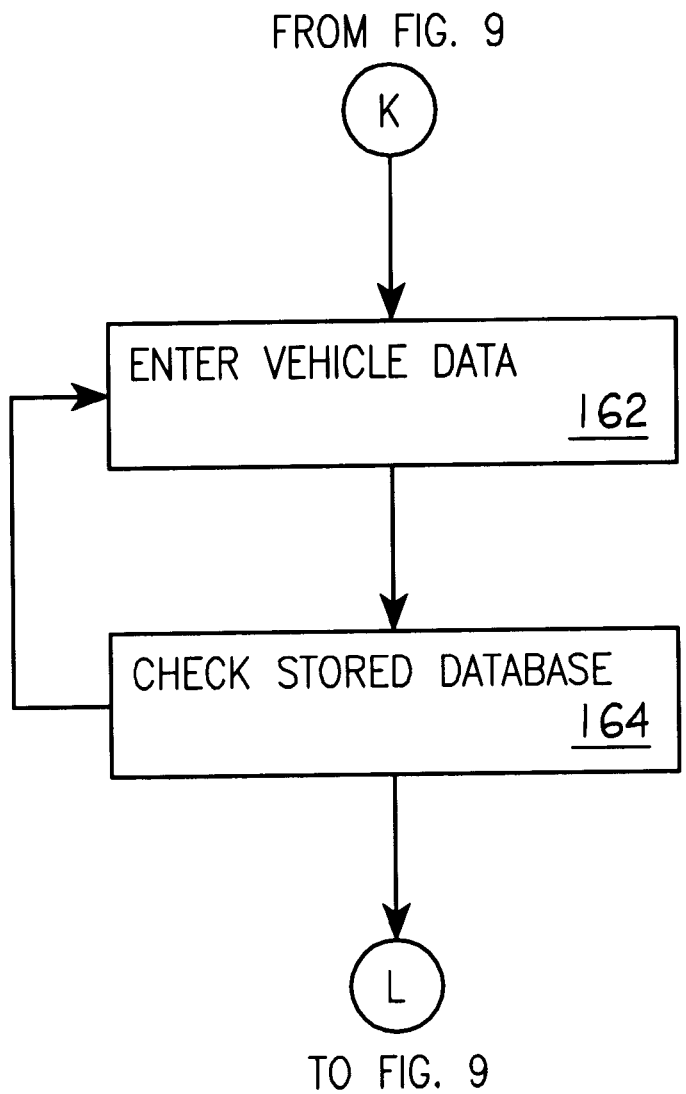
FIG. 12 is a flowchart of a software procedure for the identification tag to enter, change or add data to the identification tag memory.

FIG. 11 is the flowchart setting forth a software procedure for the VIT hardware in FIG. 3 to create, encode and transmit a message upon receiving an interrogation signal. A VIT response message is created using data stored in VIT memory. The message data and format are encoded 156 for security purposes and interleaved 158 to mitigate the effects of multipath fading. Next the message is transmitted 160. To transmit a message 160, the duplexer is switched to the transmit path, a modulation code is retrieved from memory and sent to the code generator, a synchronization block is appended to the digital data, and the transmitter initiates a synchronization pulse and sends the interleaved and encoded digital data to the encryption block. Then a modulation code is randomly selected from a list of authorized codes stored in memory and the data is modulated and transmitted. After data is transmitted 160, the duplexer is returned to receive mode 146 to receive any interrogation transmissions.

The present invention allows determination of vehicle registration data from advantageously greater distances with multiple vehicles in the range of the system. It uses radio frequency electromagnetic wave (RF) technology to obtain encoded vehicle identification and registration data. The invention allows authorized public safety officials to read vehicle identification and vehicle registration data in harsh or dirty conditions from any direction. It provides such officials 10 with the capability to identify each vehicle uniquely from a remote location even when the license plate is not clearly visible. It provides capability for computer communications to compare vehicle identification with either local or remote databases such as Department of Motor Vehicles (DMv) files, criminal files, warrant files, etc. The invention can replace passive visual techniques for determining the registration identification and ownership of vehicles used in public and private transportation, and overcomes the limitations imposed by passive optical reading methods. With rapid access to information about the vehicle, authorized officers have the capability to make optical or visual mismatch recognition quickly.

While preferred embodiments of the invention have been shown and described, it will be understood by persons skilled in the art that various changes and modifications may be made without departing from the spirit and scope of the invention which is defined by the following claims.

We claim:

1. A system for identification of a vehicle, comprising:
an interrogator for sending an interrogation signal; and
a plurality of tags located on the vehicle, each of said tags comprising a memory and a transceiver for receiving said interrogation signal and sending a response signal comprised of vehicle identification information unique to the vehicle stored in said memory; wherein said interrogator filters weak response signals and processes the strongest of said response signals received from said vehicle.

2. The system of claim 1 wherein said memory of said vehicle identification tags includes a first portion and a second portion wherein said first portion is used to store information requiring a higher level of security than the information stored in the second portion.

3. The system of claim 2 wherein data in said first portion of said memory is used to store formation suitable for use in law enforcement.

4. The system of claim 3 wherein said interrogator sends an interrogation signal to prompt said vehicle identification tags to send a response signal which comprises data from said first portion of said memory.

5. The system of claim 4 further comprising a database having additional law-enforcement-related information wherein said interrogator can associate data from said first portion of said memory with information from said law enforcement database.

6. The system of claim 5 wherein said law enforcement database comprises information associated with the registered owner of the vehicle, including owner identification, owner address, traffic violations and criminal record information.

7. The system of claim 2 wherein data in the second portion of said memory comprises information for public use.

8. The system of claim 7 wherein said interrogator sends an interrogation signal to prompt said vehicle identification tags to send a response signal comprising data in said second portion of said memory.

9. The system of claim 8 further comprising a database wherein said interrogator can associate data from said second portion of said memory with information in said database.

10. The system of claim 9 wherein said database comprises vehicle access privileges to a secure area.

11. The system of claim 9 wherein said interrogator can modify data in said second portion of said memory.

12. The system of claim 11 wherein said data in said second portion of said memory comprises prepaid tolls and said interrogator deducts toll charges from said data and rewrites said second portion of said memory with a credit balance.

13. A system for identification of a vehicle, comprising:
an interrogator for sending an interrogation signal; and
a plurality of tags located on said vehicle, each of said tags comprising a memory and a transceiver for receiving said interrogation signal and sending a response signal comprised of vehicle identification information unique to the vehicle stored in said memory
wherein in response to said interrogation signal from said interrogator, said identification tags communicate with one another to determine which of said vehicle identification tags received a more powerful interrogation signal, and wherein said response signal from said vehicle is emitted by the tag receiving the most powerful signal.

14. A system for identification of a vehicle, comprising:
an interrogator for sending an interrogation signal; and
a plurality of tags located on said vehicle, each of said tags comprising a memory and a transceiver for receiving said interrogation signal and sending a response signal comprised of vehicle identification information unique to the vehicle stored in said memory
wherein said plurality of tags on said vehicle constitute a set, wherein said transceivers of said set periodically communicate with one another using a signal which can only be detected within a predetermined distance, and wherein a tag emits an alarm signal detectable by an interrogator if one vehicle identification tag is separated more than said predetermined distance from the other vehicle identification tags of said set.

15. The system of claim 14 wherein said tags include means for emitting a visible signal if a vehicle identification tag is separated more than a predetermined distance from the other vehicle identification tags of the set.

16. A system for identification of a vehicle, comprising:
an interrogator for sending an interrogation signal; and
a plurality of tags located on the vehicle each of said tags comprising a memory and a transceiver for receiving said interrogation signal and sending a response signal comprised of vehicle identification information unique to the vehicle stored in said memory
wherein said tag transceivers on said vehicle periodically communicate with one another, and wherein one of said tags sends an alarm signal detectable by an interrogator if a tag is subjected to tampering.

17. The system of claim 13, 14 or 16 wherein a first tag is mounted on a license plate of said vehicle.

18. The system of claim 17 wherein a second tag is mounted in a secure location on the vehicle.

19. A system for identifying one vehicle out of a plurality of vehicles in an area, comprising:
an interrogator having means for spread spectrum modulation for sending an interrogation signal; and
a plurality of tags located on each of a plurality of the vehicles,
wherein each of said tags comprises a memory and a transceiver having means for spread spectrum modulation for receiving the interrogation signal and sending a response signal comprised of vehicle identification information stored in said memory, and
wherein the vehicle identification information stored in a tag memory is unique to the vehicle on which the tag is mounted; wherein said interrogator filters weak response signals and processes the strongest of said response signals received from said vehicle.

20. The system of claim 19 wherein the interrogator includes a directional antenna for limiting the direction of the interrogation signal to permit vehicle differentiation.

21. The system of claim 19 wherein said interrogator and tags include encryption means for encrypting the interrogation and response signals for security and vehicle differentiation purposes.

22. The system of claim 19 wherein said interrogator and tags include means for interleaving the transmission of the interrogation and response signals for increased reception.

23. The system of claim 19 wherein said vehicle identification tags further comprise antenna optimized for transmission ranges of greater than 200 feet.

24. A set of vehicle identification tags comprising a memory and a transceiver for receiving a predetermined interrogation signal and sending a response signal comprising information in said memory, wherein each vehicle identification tag in said set is able to communicate with the other vehicle identification tags in said set.

25. The set of claim 24 wherein in response to an predetermined interrogation signal, said vehicle identification tags communicate with one other to determine which of said vehicle identification tags received a more powerful signal, and said response signal is emitted by the vehicle identification tag receiving the most powerful predetermined signal.

26. The set of claim 24 wherein said vehicle identification tags transmits an alarm signal if one vehicle identification tag is separated more than a predetermined distance from the other vehicle identification tags.

27. The set of claim 24 wherein said vehicle identification tags transmit an alarm signal if a vehicle identification tag is subjected to tampering.

28. The set of claim 24 wherein said vehicle identification tags will produce a visible signal if a vehicle identification tag is separated more than a predetermined distance from the set.

29. The set of claim 24 wherein a vehicle identification tag is mounted on a license plate of said vehicle.

30. The set of claim 24 wherein a vehicle identification tag is mounted in a secure location on the vehicle.

31. A method for identifying vehicles, comprising:
directing an interrogation signal to an area containing vehicles, wherein each vehicle has a plurality of tags capable of identifying the interrogation signal and sending a response signal, said response signal consisting of information identifying the tagged vehicle;
initiating communications between the plurality of tags on each vehicle in response to at least one of the tags on such vehicle identifying the interrogation signal in order to determine which of the tags received a stronger interrogation signal;
directing a response signal from the tag on a vehicle receiving the stronger signal toward the source of the interrogation signal;
receiving said response signals from the vehicles in said area at an interrogator; and
distinguishing between response signals sent by tags from more than one vehicle and processing the response from a single vehicle.

* * * * *